(12) United States Patent
Enomoto

(10) Patent No.: US 6,356,339 B1
(45) Date of Patent: *Mar. 12, 2002

(54) DIGITAL PHOTO SYSTEM WHICH REPLACES A PORTION OF SUBJECT MATTER COMMON TO TWO DIGITAL IMAGES

(75) Inventor: Jun Enomoto, Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/228,554

(22) Filed: Jan. 12, 1999

(30) Foreign Application Priority Data

Jan. 12, 1998 (JP) .......................... 10-003964

(51) Int. Cl.⁷ ................ G03B 27/52; H04N 9/74; H04N 1/46; H04N 1/387
(52) U.S. Cl. .................. 355/40; 348/586; 358/540; 358/450
(58) Field of Search ................ 355/40; 358/299, 358/487, 540, 450; 345/630; 348/564, 586

(56) References Cited

U.S. PATENT DOCUMENTS

| 4,896,208 A | * | 1/1990 | Moriya et al. | 358/78 |
| 5,117,283 A | * | 5/1992 | Kroos et al. | 358/22 |
| 5,680,528 A | * | 10/1997 | Korszun | 395/135 |
| 5,739,924 A | * | 4/1998 | Sano | 358/487 |

FOREIGN PATENT DOCUMENTS

| JP | 9 120094 | 5/1997 |
| JP | 9 138483 | 5/1997 |

* cited by examiner

Primary Examiner—Russell Adams
Assistant Examiner—Peter B. Kim

(57) ABSTRACT

A digital photo system digitally exposes a light-sensitive material on the basis of digitized first image data, and outputs a print reproducing the first image data. The system includes an information input section, an image database, a data selecting section, and a data output section. The digital photo system ensures that high-quality photos of picturesque sites, mascots and other objects of interest can be offered to customers as prints free of charge regardless of weather, situation an other external conditions. In addition, the first image data may be assembled with the second image data as a constituent material for a composite image so that a composite picture can be produced in a simple but positive way.

23 Claims, 5 Drawing Sheets

FIG.1
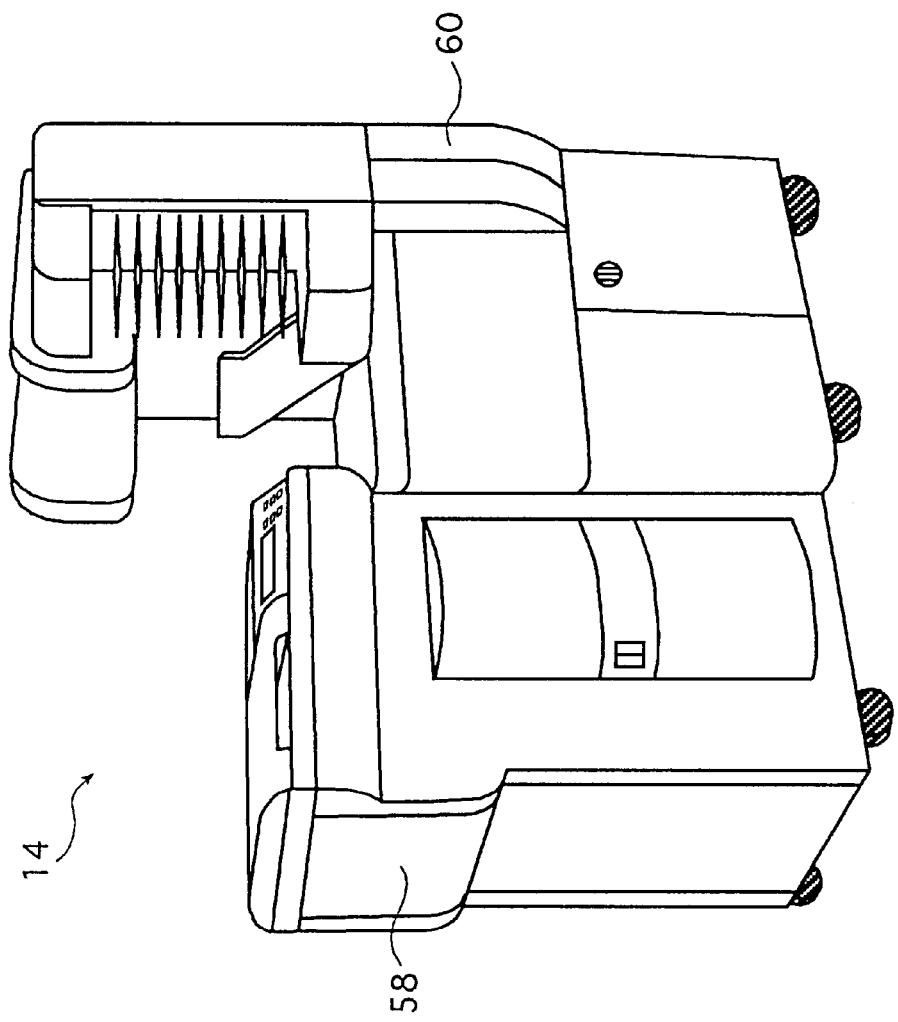
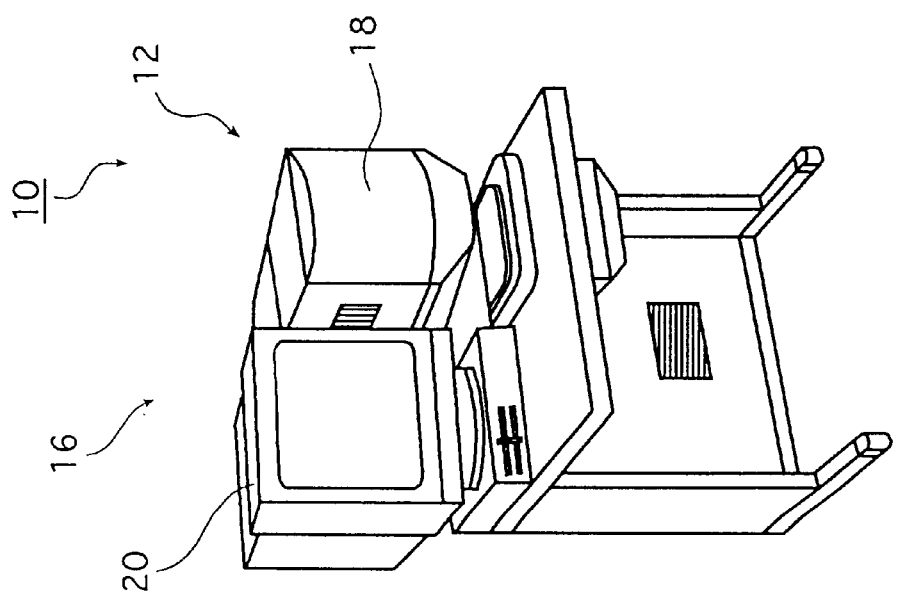

ASSEMBLING BACKGROUND

MARK, LETTER INFORMATION, PLACE, DATE

DISNEYLAND DEC.'97

DIGITAL PHOTO SYSTEM WHICH REPLACES A PORTION OF SUBJECT MATTER COMMON TO TWO DIGITAL IMAGES

BACKGROUND OF THE INVENTION

This invention relates to digital photo system that digitally exposes light-sensitive materials on the basis of digitized image data and which outputs a prints (photographs) having the image data reproduced therein.

Heretofore, the image recorded on photographic films (hereinafter referred to simply as "film or films") has been commonly printed on light-sensitive materials by means of direct exposure, in which the image on the film is projected onto the light-sensitive material to achieve its areal exposure. A new technology has recently been introduced and this is a method called "digital exposure". Briefly, the image information recorded on a film is read photoelectrically, converted to digital data and subjected to various image processing steps and, thereafter, the light-sensitive material is exposed on the basis of the digital image data. A system operating on this method has been commercialized as a digital photo system.

The digital photo system is basically composed of an input machine and an output machine. The input machine has a scanner that reads the image data recorded on an original such as a transmission original or a reflection original, a control apparatus that not only controls and manages the system in its entirety but also performs various image processing steps on the input image data, and so forth. The output machine has a printer that digitally exposes a light-sensitive material in accordance with the processed image data, a processor for developing the exposed light-sensitive material, and so forth. Typically, the input machine is separable from the output machine.

The input machine is first discussed. In the scanner, if it is set to read the image data recorded on a film, the reading light issuing from a light source is allowed to be incident on the film, from which projected light bearing the image recorded on the film is produced and focused by an imaging lens to form a sharp image on an image sensor such as a CCD sensor, the image being then captured by photoelectric conversion and optionally subjected to various image processing steps. The resulting input image data that corresponds to the image recorded on the film is thereafter supplied to the control apparatus.

In the control apparatus, the system as a whole is controlled in accordance with an operator's command and, after the input image data supplied from the scanner is digitized or after preliminarily digitized image data is supplied to the control apparatus, the conditions for various image processing steps are set in accordance with the digitized or supplied data and various image processing steps are performed on the image data while at the same time the exposing conditions are determined, whereupon output image data is transferred to the printer in the output machine.

The output machine is next described. In the printer, if it is of a type that relies upon exposure by scanning with light beams, the latter are modulated in accordance with the image data transferred from the control apparatus and deflected in a main scanning direction as the light-sensitive material is transported in an auxiliary scanning direction which is generally perpendicular to the main scanning direction, whereby a latent image is recorded as the result of two-dimensional scan exposure. Thereafter, the latent image is subjected to development and any other processing steps that are determined by the light-sensitive material, thus yielding a finished print that reproduces the image recorded on the film.

The digital photo system performs color/density correction and determines the exposing conditions by image processing, so it takes a shorter time to expose one image. In addition, the exposure time assumes a constant value that is determined by the image size, so exposure can be accomplished at a faster speed than in the case of the conventional direct exposure. As a further advantage, the digital photo system has many capabilities in image processing such as editing by, for example, assembling a plurality of images or splitting a single image into plural images, as well as color/density adjustment; as a result, finished prints can be outputted after various editing and image processing operations have been performed in accordance with specific uses.

In addition, the image information in the finished print can be stored in a magneto-optical disk and other recording media and, hence, operations such as extra printing can be done rapidly and easily without the need of reading the film again or determining the exposing conditions again. As a further advantage, the digital photo system is capable of outputting prints in which the image information recorded in films and so forth is reproduced almost completely in such aspects as resolution and color/density reproduction, although this has been difficult to attain by prints produced by the conventional direct exposure method.

Pictures taken in tourist spots such as Disneyland include those of picturesque sites such as buildings (e.g. Cinderella Castle) and other scenes in the playground, those of mascots (characters) such as Mickey Mouse and commemorative pictures taken with mascots. However, due, for example, to bad weather, it sometimes occurs that buildings or scenes fail to come out good in pictures, or pictures of mascots cannot be taken, or commemorative pictures cannot be taken with mascots.

Unexamined Published Japanese Patent Application (kokai) Nos. 120094/1997 and 138483/1997 teach a film or a film-with-lens unit in which primary information such as a letter, symbol, geometric figure, pattern or an image that provide a yet to be shot image which can form a composite picture together with an actually shot image is pre-exposed in some of the shooting frames. It is also provided with identifier information that identifies the frames in which the primary information has been exposed. The film and the film-with-lens unit are described as being capable of producing various kinds of composite pictures in an inexpensive and simple way.

A problem with such film and film-with-lens unit is that the fixed primary information that is directly exposed in some of the frames of a film increases the length of the film by the number of the frames in which the primary information of interest is exposed and the film cost is accordingly increased. On the other hand, if the number of frames in a film is adjusted to be the same as in the conventional film, the number of frames that are available for shooting is reduced by the number of the frames in which the primary information is exposed.

Films and film-with-lens units that are actually sold on the market have an added problem in that they have only limited types of images that can be subjected to primary exposure, thus narrowing the scope of choice of a suitable primary exposed image. What is more, if a composite picture is to be prepared, the user, for example, must perform positional adjustment by looking at a print of the primary exposed image and because of this difficulty in preparing composite pictures in a convenient manner, there has been a high likelihood for the failure to produce satisfactory prints.

SUMMARY

The present invention has been accomplished under these circumstances and has as an object providing a digital photo system that is capable of offering high-quality photos of picturesque sites, mascots and other objects of interest as prints free of charge irrespective of weather, situation and other external conditions.

Another object of the present invention is to provide a digital photo system by which a picturesque site, a mascot, letter information and so forth can be combined with an actually shot image in an easy and yet positive way to produce composite pictures without failure.

The stated objects of the present invention can be attained by a digital photo system that digitally exposes a light-sensitive material on the basis of digitized first image data and which outputs a print reproducing said first image data, said system comprising an information input section that enters or acquires image designating information, an image database having a preliminary storage of more than one kind of image data that corresponds to said image designating information, a data selecting section with which at least one kind of second image data that corresponds to said image designating information is selectively outputted from said image database, and a data output section with which said first and second image data are outputted to either an image data storing recording medium or a printer for digitally exposing said light-sensitive material or both.

The digital photo system of the invention has preferably an image processing section that performs various image processing steps on said first and/or second image data and which thereafter supplies the processed first and second image data to said data output section.

Said second image data is preferably outputted as image data for an additional print independent of the print corresponding to said first image data.

Said image processing section preferably performs image compositing on said first and second image data.

In yet another preferred embodiment, said information input section enters or acquires said image designating information as recorded either optically or magnetically either in a specified area of a photographic film or on the surface of a film package or both or as recorded electrically on an IC installed on a film cassette.

,BRIEF DESCRIPTION OF DRAWINGS

FIG. 1 is a perspective view of an example of the digital photo system of the present invention;

DETAILED DESCRIPTION OF INVENTION

Figure 2:
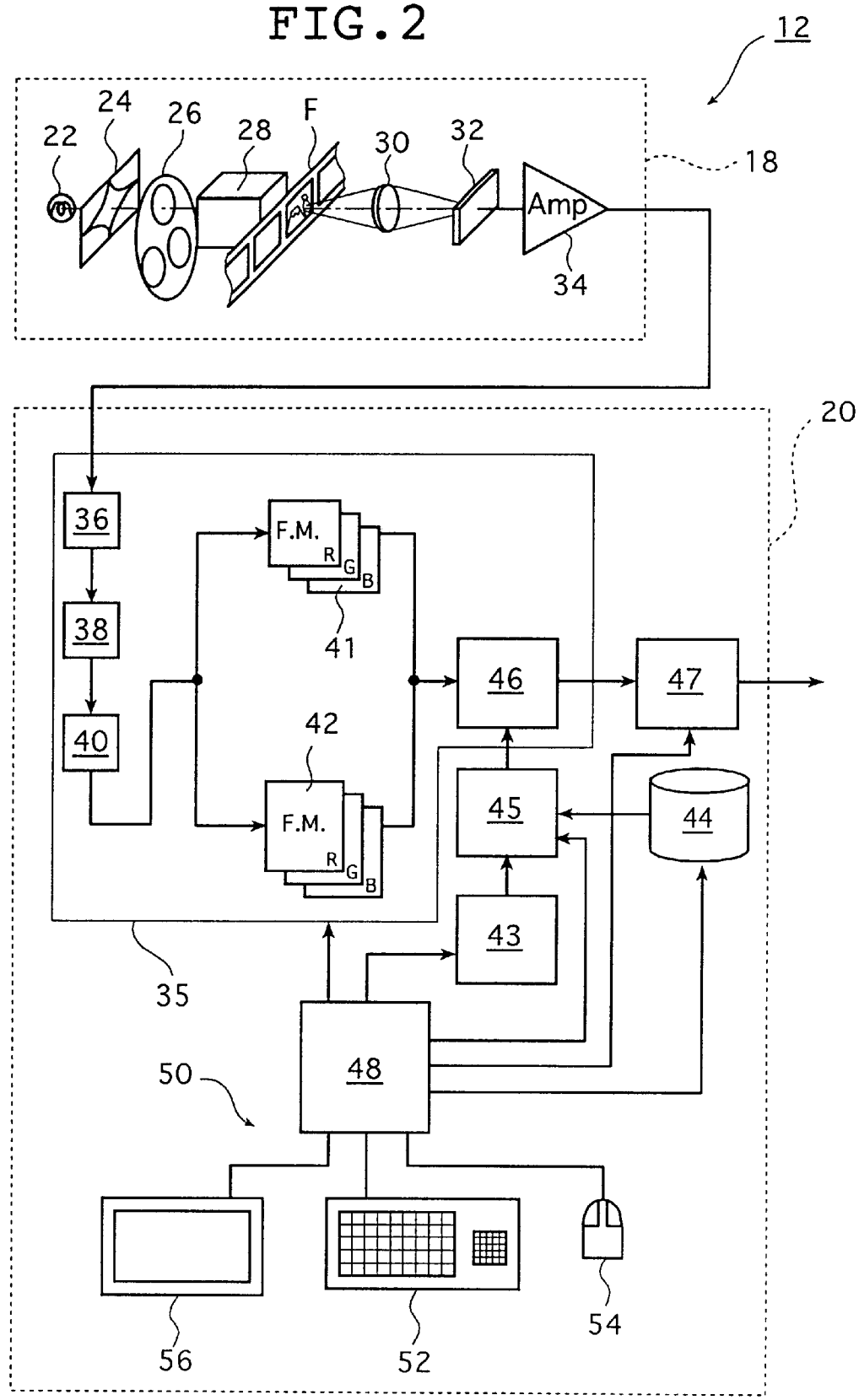
FIG. 2 shows in conceptual form the input machine in the digital photo system.

We now describe in detail the digital photo system of the present invention with reference to the preferred example shown in the accompanying drawings.

FIG. 1 is a perspective view of an example of the digital photo system of the present invention. The illustrated digital photo system 10 typically performs photoelectric reading of the image recorded on an original, converts it to digital data, performs various image processing steps on the data, exposes a light-sensitive material by digital scan in accordance with the processed image data, and outputs a print (photograph) reproducing the image recorded on the original. Having this capability, the digital photo system 10 comprises an input machine 12 and an output machine 14.

The following description of the example assumes that a photographic film (which is hereinafter referred to simply as "film") is used as the original.

It should be noted that the digital photo system 10 of the invention is capable of handling not only transmission originals such as various kinds of film but also reflection originals such as various kinds of color print (color photograph) and printed matter. It is also capable of receiving preliminarily digitized image data as the original.

In the illustrated digital photo system 10, the input machine 12 comprises a scanner 18 for photoelectric reading of the image recorded on the original and a processing apparatus 20 which not only controls and manages the system 10 in its entirety but also performs various image processing steps, either on the image data thus obtained by reading with the scanner 12 and thereafter converted to digital data, or on preliminarily digitized image data.

FIG. 2 shows in conceptual form, an example of the input machine 12. The illustrated scanner 18 is an apparatus with which the image recorded on a film F is read photoelectrically. It comprises a light source 22, a variable diaphragm 24, a color filter assembly 26 with which the image recorded on the film F is separated into three primary colors R (red), G (green) and B (blue), a diffuser box 28, an imaging lens 30, an area-type CCD sensor 32 with which the image recorded on the film F is read frame by frame, and an amplifier 34.

In the scanner 18, reading light issues from the light source 22 and has its quantity adjusted by means of the variable diaphragm 24, adjusted in color by passage through the color filter assembly 26 and diffused by the diffuser box 28 to become uniform across the plane of the film F before it is incident on the latter. Upon passing through the film F, the reading light produces projected light bearing the image recorded on the film F. The projected light is processed by the imaging lens 30 to be focused on the light-receiving plane of the CCD sensor 32, which reads the focused light photoelectrically.

The image data thus read with the CCD sensor 32 is amplified with the amplifier 34 and supplied to the control apparatus 20 as analog image data corresponding to the image recorded on the film F.

It should be noted that the scanner 18 performs this image reading step three times by successively inserting the color filters R, G and B of the color filter assembly 26, whereupon the image recorded on the film F is read as three separate primary colors R, G and B.

Prior to image reading (fine scan) for obtaining output image data, prescan is performed for rough reading of the image at low resolution. Image processing conditions are set on the basis of the image data obtained by prescan and in accordance with the thus set image processing conditions, the fine scanned image data is subjected to image processing to produce output image data for outputting the recorded image from the output machine 14. The only difference between fine scan and prescan lies in the resolution of image reading.

The control apparatus 20 in the input machine 12 comprises an image processing circuit 35 essentially composed of an A/D (analog-digital) converter 36, a LUT (look-up table) 38, a data correcting section 40, a prescan R, G, B frame memory 41 (which is hereinafter referred to simply as "prescan memory"), a fine scan R, G, B frame memory 42 (which is hereinafter referred to as "fine scan memory"), and an image processing section 46, as well as an information input section 43, an image database 44, a data selecting section 45, a data outputting section 47, a control section 48 and an input/output section 50.

The control section 48 is typically a personal computer which, via the input/output section 50, controls and manages the overall operation of the digital photo system 10. The input/output system 50 has basically a keyboard 52 and a mouse 54 which are manipulated by the operator to enter (set) various conditions, select and give commands for processing, and enter commands such as for color/density correction, as well as a display 56 for displaying the image read with the scanner 18, commands for various manipulations, windows representing the setting/registration of various conditions, and so forth.

The information input section 43 enters or acquires image designating information such as place information (e.g. the place of sale of a film or the place where picture was taken) and character information such as Disneyland, Mt. Fuji and Mickey Mouse, as well as template information. The image designating information may of course be a direct representation by letters such as Disneyland and Mt. Fuji. Preferably, in order to facilitate automatic reading with a reader, the image designating information is represented by numbers, alphabetical letters, symbols and so forth in one-to-one correspondence with each piece of the information to be registered as the image designating information; the information may also be represented in various codes such as a bar code.

Figure 3:
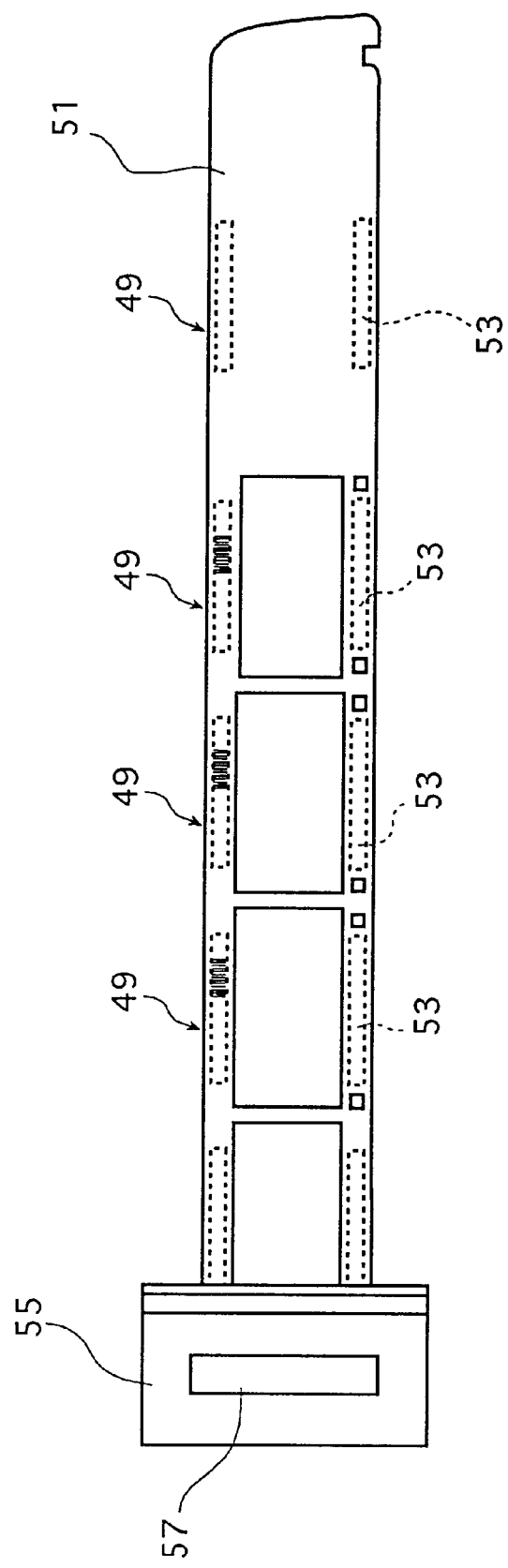
FIG. 3 shows diagrammatically an example of an APS (advanced photo system) film.

Consider, for example, a conventional film and an advanced photo system (APS) film. As shown in FIG. 3, the image designating information may be optically recorded in areas 49 along an edge of the width of the film 51 so that it is included within a code such as DX code, expanded DX code or FNS code. Particularly in the case of an advanced photo system film, the image designating information may be magnetically recorded in areas 53 along the other edge of the width of the film 51 or recorded electrically in an IC installed on a film cassette 55. Although these methods are preferred for acquiring the image designating information by automatic reading with a reader, a manual method may course be adopted such that the image designating information 57 printed on the surface of the film cassette 55, a film case, the housing of a film-with-lens unit or a film package such as a box or pouch or the image designating information the customer specifies at a photo shop is entered manually.

In the present invention, the information input section 43 may be an optical or magnetic reader such as an OCR (optical character reader), a bar code reader or a magnetic reading head or it may be an electrical reader; whichever the case, the image designating information recorded on a film or a film package is automatically read for data entry or acquisition. Alternatively, the operator may manipulate the keyboard 52, mouse 54, a tablet or some other input device to achieve direct entry of the image designating information.

In a preferred embodiment, the image designating information may be the information about the place of sale which is preliminarily recorded in a specified area of a film or a film-with-lens unit at the time of their manufacture. Alternatively, in the case where the image designating information is recorded on the surface of a film package or when it is directly designated by the customer, the information may be recorded on the film or film-with-lens unit at the time of their development, with the recorded information being then entered or acquired by the information input section 43. The image designating information need not be one in kind and, if necessary, two or more kinds of image designating information may be recorded, entered or acquired.

The image database 44 which is typically a hard disk or a compact disk is a preliminary storage of more than one kind of image data in correspondence with the image designating information. If more than one digital photo system 10 is to be used, the image database may be provided for each digital photo system. Alternatively, a single image database 44 may be shared by more than one digital photo system 10 via a network. Two schemes may of course be used in combination.

The image database 44 has the additional advantage that the various kinds of image data to be stored can be replaced as desired in such terms as tourist spot, season and time of limitation and, hence, a sufficiently large number of image choices are available to ensure that the image data can be altered in correspondence with the image designating information. It should be noted here that the image data to be stored in the image database 44 is not limited to data that is complete enough to provide a single full picture. It may contain various kinds of image data, character data and others that serve as constituent materials for a final picture. These materials data have preferably a higher resolution.

The data selecting section 45 provides selective outputting from the image database 44 of at least one kind of image data that corresponds to the image designating information. The data selecting section 45 may be so adapted that random image data is automatically outputted in a selective manner. Alternatively, the customer may manipulate the keyboard 52, mouse 54 or other input device to selectively output the image data he designated at a photo shop. If desired, the operator may select a suitable kind of image data that is displayed on the display 56. In the case where more than one kind of image designating information has been entered or acquired, at least one kind of image data that corresponds to each kind of image designating information is selectively outputted from the data selecting section 45 for each kind of image designating information.

In the image processing section 46, the image data as read out of the prescan memory 41 and the fine scan memory 42, or the image data that has been selectively outputted from the image database 44 by means of the data selecting section 45 are subjected to various correction and image processing steps such as the correction of color/gradation, image enlargement/contraction (electronic scaling) in accordance with a specified electronic scaling ratio, compression/extension of the dynamic range, sharpening and image assembling. The image processing section 46 is basically intended for processing the image data as read out of the prescan memory 41 and the fine scan memory 42 and/or the image data that has been selectively outputted from the image database 44 by means of the data selecting section 45. If desired, the input image data may be left intact and outputted as such.

The data output section 47 which is the last component of the control apparatus 20 is such that the as processed image data supplied from the image processing section 46 is outputted to either an image data storing recording medium such as a CD (compact disk), an MO (magneto-optical disk) or a DVD (digital video disk) or the output machine 14 or both.

The analog image data R, G and B that have been read with the scanner 18 are converted to a digital form by means of the A/D converter 36, converted to density data by logarithmic transformation with the LUT 38, subjected to specified processing steps such as DC offset correction, darkness correction and shading correction in the data correcting section 40 and thereafter stored in R, G, B prescan memory 41 and R, G, B fine scan memory 42 in prescan and fine scan modes, respectively.

Thus, the image designating information is entered or acquired by the information input section 43 and the image data that corresponds to the image designating information is selectively outputted from the storage in the image database 44 by means of the data selecting section 45 and subsequently inputted into the image processing section 46.

After the image data has been stored in the prescan memory 41, the image processing section 46 reads it out of the prescan memory 41 and sets the conditions for various image processing steps such as color/gradation correction, electronic scaling, compression/extension of the dynamic range and sharpening. The prescanned image obtained by image processing under the thus set conditions is displayed on the display 56 and, if necessary, verified by the operator and adjusted for color/density, gradation and other parameters so as to determine final image processing conditions.

After the final image processing conditions have been determined, the operator gives a command for OUTPUT START, whereupon the image processing section 46 reads the fine scanned image data out of the fine scan memory 42 and, in accordance with the determined final image processing conditions, performs various image processing steps such as correction of image's color and gradation, image, image enlargement or contraction at a specified electronic scaling ratio, compression or extension of the dynamic range of the image data, and sharpening.

The image data that has been selectively outputted by the data selecting section 45 and thereafter outputted to the image processing section 46 may be processed as image data for an entirely independent single picture and inputted to the data output section 47 together with the processed, fine scanned image data. Alternatively, said image data is assembled with the fine scanned image data as a constituent material for composite image and the resulting image data is inputted to the data output section 47. In either case, the entered image data is recorded on a suitable medium or transferred to the output machine 14. It should be noted that the image data that has been selected by means of the data selecting section 45 and which has been processed as image data for an entirely independent single picture, as well as the image data that has been selected by means of the data selecting section 45 and which has been assembled with the fine scanned image data as a constituent material for composite image are not limited to one kind and may comprise two or more kinds. If desired, two or more and even all frames of image (fine scanned image data) that need be processed in one batch may be assembled with identical or differing images (the image data that has been selectively outputted by the data selecting section 45 and which has been inputted to the image processing section 46).

Thus, in the digital photo system 10 of the invention, image data corresponding to the image designating information is selectively outputted from the image database 44. Accordingly, as compared with the conventional system that directly exposes fixed primary information in a specified frame of a film, the digital photo system 10 offers the advantage of permitting economical use of the film. In addition, the film having the image designating information recorded therein can be dealt with in entirely the same manner as the conventional films by means of digital photo systems other than the digital photo system 10 of the invention.

A further advantage of the digital photo system 10 of the invention is that in addition to the picture of an image actually taken by the customer, various kinds of image data selectively outputted from the image database 44 in accordance with the different kinds of image designating information entered or acquired by means of the image input section 43 can be outputted as an entirely independent additional picture. Hence, high-quality photos of picturesque sites, mascots and other objects of interest can be offered as prints free of charge regardless of weather, situation and other external conditions and, thus, services of added value can be offered to the customer.

Figure 4A:
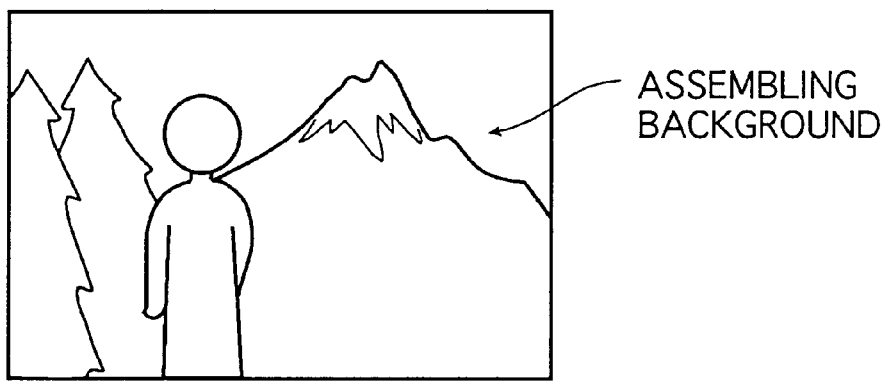
FIGS. 4a and 4b show in conceptual form two examples of a composite image.
Figure 4B:
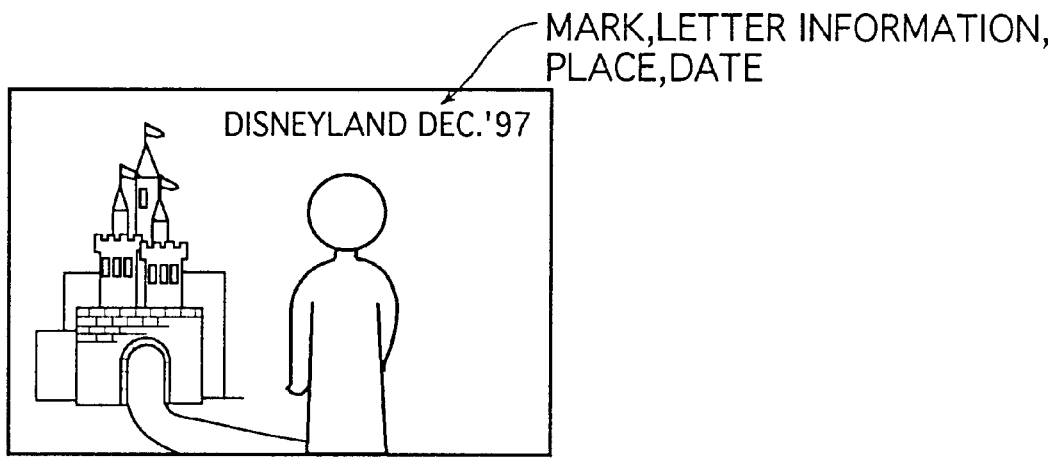

The digital photo system 10 of the invention has the added advantage that the image actually recorded by the customer on a film can be assembled in a simple but positive way with the image data that is selectively outputted from the image database 44 in accordance with specific image designating information. For example, the background of the image taken by the customer may be replaced by the picture of the image data selectively outputted from the image database 44 (see FIG. 4a) or the principal object of the picture may be assembled with the image data on the mascot. Alternatively, the image taken by the customer may be assembled with various kinds of information such as a mark, letter information, place and date.

Described above is the construction of the input machine 12.

We now describe the construction of the output machine 14. It comprises basically a printer 58 and a processor 60; the printer 58 records a latent image by exposing a light-sensitive material A through scanning with light beams modulated with the output image data delivered from the image processing section 46 of the control apparatus 20 in the input machine 12. The processor 60 develops and dries the light-sensitive material A having the latent image recorded by means of the printer 58, thereby producing finished prints which are then sorted.

Figure 5:
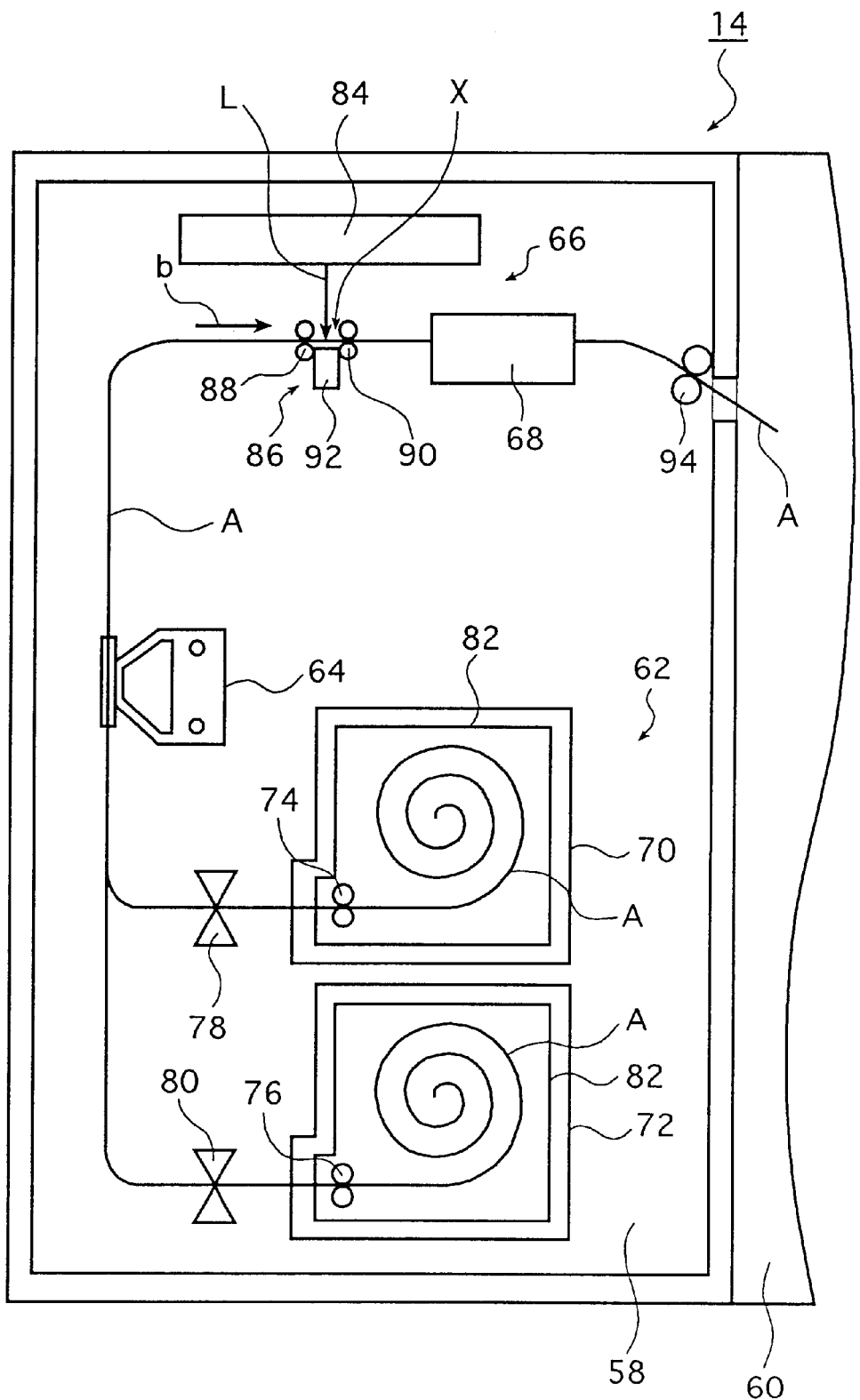
FIG. 5 shows in conceptual form a part of an example of the output machine in the digital photo system.

FIG. 5 shows in conceptual form a part of an example of the output machine 14. As shown, the printer 58 cuts a web of light-sensitive material (paper) A to individual sheets of a specified length corresponding to the finished prints to be produced and, after back printing (recording of a back print) and digital exposure, the exposed light-sensitive material A is supplied to the processor 60. In the illustrated case, the printer 58 comprises basically a light-sensitive material supply section 62, a back printing section 64, an image recording section 66 and a distributing section 68.

The printer 58 also has a plurality of transport roller pairs as means of transporting the light-sensitive material A from the light-sensitive material supply section 62 to the image recording section 66 and further transporting the as-exposed light-sensitive material A to the processor 60. Transport guides, various sensors and other members associated with the light-sensitive material A are also incorporated, as required, in the printer 58. The means of transporting the light-sensitive material A is not limited in any particular way and aside from transport rollers, all of the known methods for transporting sheetings such as belt conveyors, nip belts and lift transport using suckers or the like may be employed.

In the printer 58, the light-sensitive material supply section 62 comprises basically loaders 70 and 72, magazines 82 and cutters 78 and 80. The loaders 70 and 72 are sites into which magazines 82 containing the light-sensitive material A are loaded. The magazines 82 to be loaded into the two loaders 70 and 72 are usually adapted to contain different types of light-sensitive material A which is characterized by size (width), surface gloss (silk-finish, matte and so forth), specifications (e.g., thickness and base type), and so forth.

Each of the magazines 82 is a lightproof case containing a web of the light-sensitive material A with its recording surface (emulsion-coated side) facing outward. In the illustrated case, two withdrawing roller pairs 74 and 76 are contained in the magazines 82. The upper roller of each pair may be a drive roller. When the magazines 82 are placed in a specified position in the loaders 70 and 72, the drive rollers are brought into engagement with drive sources (not shown) for the withdrawing roller pairs 74 and 76 that are provided in the respective loaders.

In the light-sensitive material supply section 62, the light-sensitive material A is drawn out of the magazine 82 by means of the withdrawing roller pair 74 or 76 and transported by the transport means toward the back printing section 64 which is located downstream in the direction of transport of the light-sensitive material A (the term "downstream" as used hereinafter shall have this meaning). The transport stops at the point of time when the light-sensitive material A has been transported downstream by a distance corresponding to the length of each of the finished prints to be produced. Subsequently, the light-sensitive material A is cut to individual sheets by means of cutters 78 and 80 provided between the magazine 82 and the back printing section 64.

In the illustrated case, the back printing section 64 is located downstream of the light-sensitive material supply section 62. In a specified area of the reverse surface (non-emulsion coated side) of the light-sensitive material A, the back printing section 64 records a back print including various pieces of information, such as the date when the picture was taken, the date of printing (exposure), frame number, film ID number, ID number of the camera used to take the picture, and ID number of the digital photo system 10. Cut sheets of the light-sensitive material A are subjected to back print recording by means of the back printing section 64.

The image recording section 66 is located downstream of the back printing section 64. In the illustrated case, the image recording section 66 comprises an exposing unit 84 and a scan transport means 86. The exposing unit 84 scan exposes the light-sensitive material A in a main scanning direction (normal to the plane of FIG. 5) in accordance with the output image data supplied from the image processing section 46 of the control apparatus 20 in the input machine 12, and the scan transport means 86 transports the light-sensitive material A at a constant speed in an auxiliary scanning direction that is generally perpendicular to the main scanning direction (and which is indicated by arrow b).

The exposing unit 84 is an optical beam scanner that is essentially composed of three light sources which issue light beams L for exposing the light-sensitive material A with red (R), green (G) and blue (B) lights, a modulating means such as AOM (acousto-optical modulator) which modulates the light beams L from the light sources in accordance with the image data, a light deflector such as a polygonal mirror which deflects the modulated light beams in the main scanning direction, and an fθ (scanning) lens with which the light beams deflected in the main scanning direction are focused to form a beam spot of a specified size at a specified point in the exposing position (scan line) X in cooperation with specified beam optics.

The scan transport means 86 is essentially composed of two transport roller pairs 88 and 90 that are provided on opposite sides of the exposing position X and an exposure guide 92 for holding the light-sensitive material A more precisely in the exposing position X.

The scan transport means 86 is not limited to the construction just described above and another example is a scan transport means using an exposing drum that transports the light-sensitive material A as it is held in the exposing position X and two nip rollers which are provided on opposite sides of the exposing position X in such a way that they are held in contact with the exposing drum.

In the image recording section 66, the exposing unit 84 records an image on the light-sensitive material A by "raster scan exposure", in which the light beams L modulated in accordance with digital image data are deflected in the main scanning direction while the light-sensitive material A, as it is held in the exposing position X along the exposure guide 92, is transported in the auxiliary scanning direction generally perpendicular to the main scanning direction by means of the transport roller pairs 88 and 90 in the scan transport means 86, whereupon the light-sensitive material A is exposed by two-dimensional scan so as to form a latent image.

The distributing section 68 is located downstream of the image recording section 66.

In the steps of exposure and development of silver salt photographic materials which are currently used in common photography, development takes more time than exposure. Therefore, if two or more sheets of light-sensitive material are consecutively exposed and developed, exposure outpaces development, making it necessary to accommodate the sheets of the exposed light-sensitive material temporarily in a stocker or some other storage means. In other words, development and subsequent processing are generally rate limiting in the steps of exposure and development.

The distributing section 68 is a device which, depending on the need, distributes sheets of the light-sensitive material A into a plurality of rows in a direction perpendicular to their transport so that plural rows of the light-sensitive material A are supplied in parallel into the processor 60, whereby the throughput of the processor 60 is sufficiently improved to absorb the difference in processing time between exposure and development. If sheets of the light-sensitive material A are alternately set aside to either right and left, they can be distributed into two rows. If the sheets are alternately set aside to either right and left while the center sheet is simply allowed to pass straight, they can be distributed into three rows.

The sheets of light-sensitive material A that have been distributed sidewise into a plurality of rows are transported by a transport roller pair 94 to be supplied into the processor 60 via an outlet of the printer 58. If the light-sensitive material A to be developed is a silver salt photographic material, it is subjected to a suitable specified development process comprising color development, bleach-fixing, water rinse and so forth, whereupon the latent image is rendered visible. Thereafter, the light-sensitive material A is dried to produce a finished print. The thus obtained prints are stacked in a single row in the order of print production (i.e., the order of exposure) and emerge from the processor 60 to go to a sorter or the like.

Described above is the construction of the output machine 14.

We now describe the operation of the digital photo system 10.

When the operator gives a command for the start of print production, the input machine 12 first performs prescan with the scanner 18 so that the prescanned image data for the image recorded on the film F is stored in the prescan memory 41.

When prescan ends, the image processing section 46 reads the prescanned image data from the prescan memory 41, whereupon the image processing conditions are set and the prescanned image is displayed on the display 56.

If necessary, the operator verifies the prescanned image and manipulates the input/output section 50 to make adjustment of color/density, gradation and other parameters so as to determine the final image processing conditions.

Subsequently, the scanner 18 performs fine scan and, as in the case of prescan, the fine scanned image data for the image recorded on the film F is stored in the fine scan memory 42.

In addition, image designating information is entered or acquired by the information input section 43 and the image data that corresponds to a specific kind of image designating information is selectively outputted from the storage in the image database 44 by means of the data selecting section 45 and subsequently inputted into the image processing section 46.

Then, the operator gives a command for PRINT OUTPUT, whereupon the image processing section 46 reads the fine scanned image data from the fine scan memory 42 and performs various image processing steps on the data in accordance with the final image processing conditions.

The image data that has been selectively outputted by the data selecting section 45 and thereafter outputted to the image processing section 46 may be processed as image data for an entirely independent single picture and inputted to the data output section 47 together with the processed, fine scanned image data. Alternatively, said image data is assembled with the fine scanned image data as a constituent material for composite image and the resulting image data is inputted to the data output section 47. In either case, the entered image data is recorded on a suitable medium such as a compact disk or transferred to the output machine 14 as output image data.

In the output machine 14, the AOMs in the exposing unit 84 in the image recording section 66 of the printer 58 are driven in accordance with the output image data transferred from the image processing section 46 of the input machine 12 and the light-sensitive material A is exposed by scanning with the light beams that are modulated in accordance with the output image data and which are deflected in the main scanning direction, whereupon a latent image is formed on the light-sensitive material A. The exposed light-sensitive material A then enters the processor 60, where it is processed by sequential steps of color development, bleach-fixing and water rinse. The processed sheets of light-sensitive material A are dried to produce finished prints, which are then sorted in a sorter.

Described above is the basic operation of the digital photo system 10.

It should be noted that the construction of the digital photo system of the present invention is by no means limited to that described in the foregoing example. In the example described above, a web of light-sensitive material is cut to sheets of a specified length before exposure; however, this is not the sole case of the invention and, needless to say, a web of light-sensitive material may be cut to sheets of the print size after exposure and development.

While the digital photo system of the present invention has been described above in detail, it should be noted that the invention is by no means limited to the foregoing example and various improvements and modifications may of course be made without departing from the scope and spirit of the invention.

As described above in detail, the present invention provides a digital photo system that digitally exposes a light-sensitive material on the basis of digitized first image data and which outputs a print reproducing said first image data and in the system, image designating information is entered or acquired and at least one kind of second image data that corresponds to said image designating information is selectively outputted from an image database having a preliminary storage of more than one kind of image data that corresponds to said image designating information, and said first and second image data are outputted to either an image data storing recording medium or a printer for digitally exposing said light-sensitive material or both.

Having these features, the digital photo system of the invention, by outputting the second image data in the form of a single picture, ensures that high-quality photos of picturesque sites, mascots and other objects of interest can be offered to customers as prints free of charge regardless of weather, situation and other external conditions. In addition, the first image data may be assembled with the second image data as a constituent material for a composite image so that a composite picture can be produced in a simple but positive way.

What is claimed is:

1. A digital photo system for creating an improved image on the basis of first image data and for outputting a print based upon the first image data, said system comprising:

an information input section adapted to input image designating information associated with the first image data;

an image database adapted to store second image data in association with said input image designating information;

a data selecting section adapted to selectively designate second image data corresponding to said image designating information for output from said image database; and a data output section for creating and outputting a print of an improved image including the first and second image data upon the data selecting section being designated to output the second image data, wherein the second image data replaces at least a portion of the first image data of subject matter which is common to both the first and second image data as dictated by the image designating information, when the second image data is selectively designated for output, to thereby create an improved image.

2. The digital photo system according to claim 1, further comprising:

an image processing section, adapted to perform image processing steps on at least one of said first and second image data, thereafter supplying the processed first and second image data to said data output section.

3. The digital photo system according to claim 1 or 2, wherein said second image data is outputted as image data for an additional print, independent of the print corresponding to said first image data.

4. The digital photo system according to claim 2, wherein said image processing section creates a composite image, including said first and second image data.

5. The digital photo system according to claim 1, wherein said information input section is adapted to input said image designating information recorded on at least one of photographic film, a film package and an IC installed on a film cassette.

6. The digital photo system of claim 5, wherein said image designating information is optically or magnetically recorded on at least one of said photographic film and a film package.

7. The digital photo system of claim 5, wherein said information input section is adapted to input said image designating information by optically or magnetically reading said recorded image designating information.

8. The digital photo system of claim 1, wherein said image designating information is stored in association with information corresponding to said first image data.

9. The digital photo system of claim 8, wherein the information corresponding to said first image data includes information stored on a photographic film.

10. The digital photo system of claim 8, wherein the image designating information is recorded on at least one of photographic film, a film package, and a film cassette.

11. The digital photo system of claim 1, wherein the second image data includes background information.

12. The digital photo system of claim 1, wherein the second image data includes information of a prestored fictional character.

13. The digital photo system of claim 1, wherein the first image data includes photographic image data, obtained from a photographed image.

14. The digital photo system of claim 13, further comprising:

an image scanner, adapted to scan photographic film to produce the first image data.

15. The digital photo system of claim 13, wherein the second image data includes background information.

16. The digital photo system of claim 14, wherein the second image data includes background information.

17. The digital photo system of claim 13, wherein the second image data includes information of a prestored fictional character.

18. The digital photo system of claim 14, wherein the second image data includes information of a prestored fictional character.

19. The digital photo system of claim 11, wherein the background information includes information corresponding to a known place.

20. The digital photo system of claim 15, wherein the background information includes information corresponding to a known place.

21. The digital photo system of claim 16, wherein the background information includes information corresponding to a known place.

22. The digital photo system of claim 1, further comprising:

a display, adapted to display the photographic first image data and the second image data stored in correspondence with the input image designating information.

23. The digital photo system of claim 22, wherein the first image data and the stored second image data are concurrently displayed.

* * * * *